United States Patent [19]

Cesna

[11] 4,270,314
[45] Jun. 2, 1981

[54] BEARING MOUNT FOR LAPPING MACHINE PRESSURE PLATE

[75] Inventor: Joseph V. Cesna, Niles, Ill.

[73] Assignee: Speedfam Corporation, Des Plaines, Ill.

[21] Appl. No.: 76,306

[22] Filed: Sep. 17, 1979

[51] Int. Cl.³ .............................................. B24B 7/04
[52] U.S. Cl. ................................................. 51/131.4
[58] Field of Search ................... 51/129, 130, 131.1, 51/131.2, 131.3, 131.4, 131.5, 216 A, 216 LP, 216 T

[56] References Cited

U.S. PATENT DOCUMENTS

| 2,968,135 | 1/1961 | Boettcher et al. | 51/129 |
| 3,128,580 | 4/1964 | Davis | 51/131.5 |
| 3,342,652 | 9/1967 | Reisman et al. | 51/131.4 |
| 3,603,042 | 9/1971 | Boettcher | 51/131.4 |
| 3,886,696 | 6/1975 | Bruck | 51/216 LP |
| 4,148,160 | 4/1979 | Pranier | 51/216 LP X |

*Primary Examiner*—Gary L. Smith
*Assistant Examiner*—Robert P. Olszewski
*Attorney, Agent, or Firm*—Charles F. Pigott, Jr.

[57] ABSTRACT

This disclosure teaches structure for mounting a pressure plate relative to its supporting shaft in such a manner that axial forces are transmitted between the shaft and pressure plate while yet providing that the plate can freely rotate and swivel relative to the shaft even at varying angles of tilt. The mounting structure includes a pair of angular contact bearings arranged in back to back relationship, the inner races thereof being confined on the shaft and the outer races thereof being confined within a housing block. The housing block is nonrotatably keyed to the pressure plate and a single ball bearing is mounted between the pressure plate and bearing block in axial alignment with the shaft and with the pressure plate. In effect then, one of the angular contact bearings is working to allow free pressure plate rotation and swivel when axial compression forces are applied between the shaft and pressure plate, and the single ball bearing self aligns the axial force coaxially of the shaft and bearing plate; while the other angular contact bearing is working to allow free pressure plate rotation and swivel when the shaft is elevated and the plate is not supported on its underside.

6 Claims, 6 Drawing Figures

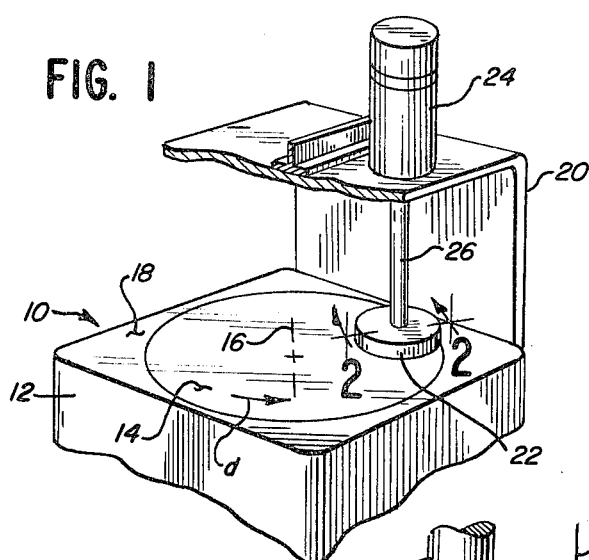
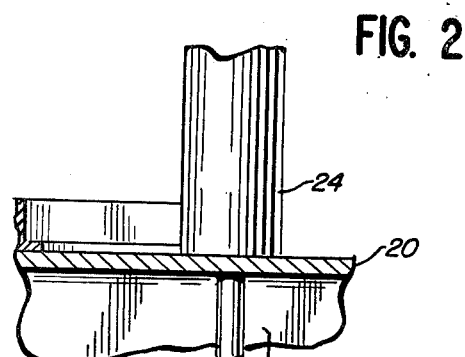
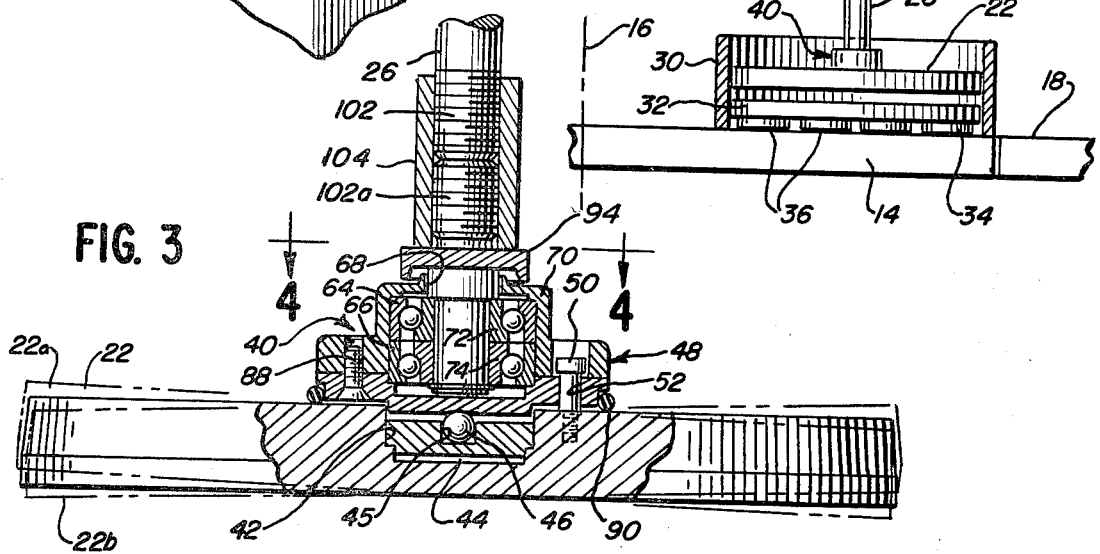
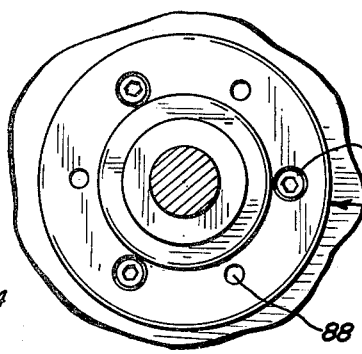
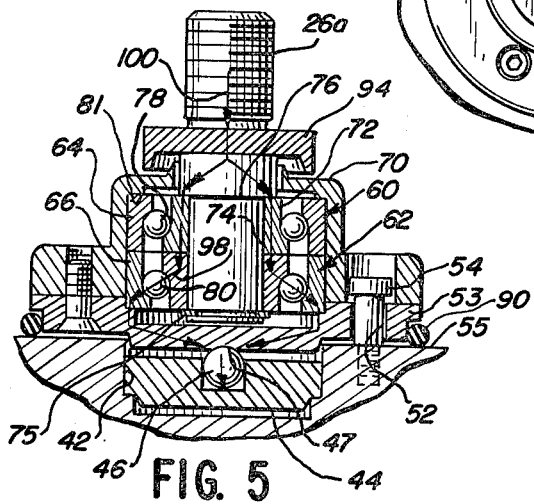

BEARING MOUNT FOR LAPPING MACHINE PRESSURE PLATE

BACKGROUND OF THE INVENTION

Numerous machines have been devised for producing flat lapped surfaces on machined, ground, or precision cast work pieces. A common example of such a lapping machine comprises a lap wheel or plate, usually annular in configuration, which is centrally rotated about a vertical axis and against which the work pieces in confined positions are placed. The movement of the lap wheel relative to the work pieces thus brings about abrasive wear of the surface of each work piece that engages the contacting surface of the lap wheel. A prime consideration in a machine of this class is the contacting surface itself on the lap wheel should be planar or near planar. Abrasive engagement of such contacting surface with the work pieces can wear it unevenly, and when such uneven wear occurs, the effectiveness of lapping is reduced.

One effort to maintain the contacting surface on the lap wheel planar includes the provision of a truing and retaining ring rested on the contacting surface annularly of one or more of the work pieces and of the pressure plate of the machine. The ring serves the dual purpose of holding one or more of the work pieces within itself, and further in rotating about its own central axis against the contacting surface of the lap wheel tends to wear the contacting surface in a more uniform pattern as compared to when the specific work pieces only engage the contacting surface. Efforts in this regard include U.S. Pat. No. 3,110,988 which pertains to the means for selectively rotating these truing and retaining rings under power in order to more evenly wear the contacting surface of the lap wheel.

Of prime concern also is the manner in which the pressure plate of the lapping machine engages the upper side of the work pieces, or a fixture holding the work pieces, and biases the work pieces toward the lap wheel. The pressure plate itself is normally mounted to rotate about a vertical axis laterally offset from the vertical axis of rotation of the lap wheel, and means are provided for axially biasing the pressure plate in the direction towards the lap wheel to create adjustable pressures of contact between the lap wheel and the work pieces. Bearing structure generally is provided between each pressure plate and its mounting shaft so as to allow the pressure plate to rotate freely about the shaft.

Notwithstanding the specific structural means employed to maintain the contacting surface of the lap wheel planar, the surface does become out of plane and consequently a cant pressure can build up between the pressure plate and the supporting shaft to the extent that the pressure plate must wobble or rotate about an axis that is not coincidental to the axis of the shaft. This canting pressure can be caused by the dished shape assumed by the rotating lap wheel, either concave or convex toward the work pieces. This canting pressure further can be caused by a slight lateral deflection of the pressure plate shaft itself, or by wobble of the shaft which is generally but an extension of the pressure cylinder rod. This canting pressure can even yet be caused to varying degrees because of differential drag incurred between the lap wheel and the work pieces confined beneath the pressure plate as the lapping operation progresses. Because of the intended continuing movement or rotation of the pressure plate and of the truing and retaining ring about each respective axis, this canting misalignment would occur during each rotation of the pressure plate.

A further consideration in the shaft mounting of the pressure plate is the magnitude of the axial force encountered between these components, and the resulting lateral forces encountered caused by the frictional drag of the work piece against the lap wheel. The axial forces are adjusted as dictated by many factors including the size or durability of the work pieces and the speed or stage of cut of the lap wheel, but can range between several hundred and several thousand pounds; while the lateral forces are only a percentage of the axial forces. The mounting structure between the pressure plate and its supporting shaft must be capable of accommodating these large forces while yet allowing the pressure plate to rotate and swivel freely.

SUMMARY OF THE INVENTION

This invention relates to mounting structure between a pressure plate and its supporting shaft, such being associated with a lapping machine of the type where a lap wheel is rotated generally about a vertical axis and where the pressure plate is likewise mounted to rotate relative to its supporting shaft about a vertical or near vertical axis laterally offset from the lap wheel axis. The disclosed mounting structure between the pressure plate and the supporting shaft includes bearing means suited both for allowing free rotation, even at varying angles of tilt, of the pressure plate relative to the supporting shaft; and for transmitting axial thrust loads incurred between the shaft and the pressure plate. The disclosed mounting structure utilizes a pair of angular contact bearings that are positioned back to back relative to the supporting shaft, where one such bearing thereby is suited for imposing the axial pressure loads of the shaft against the pressure plate and where the other such bearing is suited for supporting the deadweight of the pressure plate itself once the shaft has been elevated and the pressure plate is unsupported on its underside. The disclosed bearing mount structure further utilizes a single ball bearing mounted in axial alignment with the supporting shaft for transmitting the axial thrust loads of the shaft in a self-aligning fashion to a central portion of the pressure plate notwithstanding the dynamics of pressure plate rotation and wobble.

BRIEF DESCRIPTION OF THE DRAWINGS

FIG. 1 is a perspective view of a typical lapping machine showing the rotating lap wheel, the pressure plate and its supporting shaft;

FIG. 2 is a sectional type view as seen generally from line 2—2 in FIG. 1, illustrating the same components again but on a larger scale, and also showing a retaining ring surrounding the pressure plate which ring is not illustrated in FIG. 1;

FIG. 3 is a view similar to FIG. 2, but illustrating on still a larger scale the inventive mounting structure between the pressure plate and its supporting shaft;

FIG. 4 is a plan view as seen generally from line 4—4 in FIG. 3; and

FIGS. 5 and 6 are views similar to FIG. 3, however additionally illustrating in schematic representation the force components encountered, respectively, during the lapping operation with the transmission of the axial forces and during the loading/unloading operation with the pressure plate lifted by the shaft and unsupported on its underside.

DETAILED DESCRIPTION OF THE INVENTION

Referring to the drawings and specifically to FIG. 1, the illustrated lapping machine 10 has a stationary base 12 and a lap wheel 14 supported to rotate about the center axis 16, which generally is disposed vertically. The specific drive structure and/or mounting for the lap wheel 14 is of no concern to the subject invention, nor in fact is the lapping machine 10 itself. However, such structures are described more fully in U.S. Pat. Nos. 2,869,294 and 2,912,799, owned by the assignee of this application.

Surrounding the rotating lap wheel 14 is a stationary table like surface 18. Located over the rotating lap wheel 14 is a bridge structure 20 from which a pressure plate wheel 22 (see FIG. 2 also) is supported through the intermediary of a pressure cylinder 24 and its shaft 26. Only one pressure plate assembly is shown, but three or more would be used commonly on a typical lapping machine as shown in the above-mentioned U.S. Pat. No. 3,110,988.

Surrounding each pressure plate 22 is a truing and retainer ring 30 (see FIG. 2) which fits with moderate clearance over the pressure plate and thereby can freely rotate relative to the pressure plate. Located under the pressure plate and within the truing and retaining ring is typically a fixture 32 that holds therein a number of smaller work pieces 34 each of which presents a lower face 36 that directly engages the upper contact face of the rotating lap wheel 14. Upon actuation of the cylinder 24, the pressure plate biases the fixture 32 and the work pieces 36 confined therein against the lap wheel 14 with the axial compressive force desired, which can range between approximately several hundred and several thousand pounds. There typically further is a means (not shown) for applying an abrasive slurry between the lap wheel and the work pieces to be lapped, which can be a manual or an automatic feed device, and several such slurry feed systems are illustrated in U.S. Pat. Nos. 2,912,802 and 3,110,991.

The lapping machine 10 operates with the lap wheel 14 rotating about axis 16 in a unitary direction as indicated by the arrow d in FIG. 1, while the pressure plate 22, the truing and retaining ring 30, and the work pieces 34 are offset radially from this axis. The work pieces 34 are confined or held fast in the fixture 32, and the fixture itself and pressure plate 22 are supported to rotate generally about the longitudinal axis of shaft 26 as caused by the frictional drag against the lap wheel 14.

Normally the shaft 26 is parallel to the axis 16 of lap wheel rotation, and the underface of the pressure plate 22 is parallel to the contacting face of the lap wheel 14. As noted above however, the lap wheel surface frequently becomes untrue, grooved, or wavy, to cause the pressure plate in following parallel to the lap wheel surface to cant relative to its normal center axis of rotation. Consequently, the mounting of the pressure plate 22 to the shaft 26 must allow free rotation of the pressure plate about its central axis as well as free gimbeling or wobbling of the pressure plate relative to the shaft 26 even incidental to its rotation.

The specifics of the disclosed invention including the improved mounting means 40 will now be described in detail and reference for this purpose is specifically directed to FIGS. 3—6. Note initially that there is located in the pressure plate 22 a central counterbored opening 42 within which is seated a bearing seat 44 having a central recess 45. A self aligning spherical ball 46 is located in the recess 45 lined up with the central transverse axis of the annular pressure plate 22; and it also is received in a recess 47 formed in the underside of a bearing housing block 48 and coaxially aligned with the center axis of the shaft 26.

Secured to the pressure plate 22 by three spaced shoulder bolts 50 is the bearing housing block 48 which thus rotates with the pressure plate. However, the smooth shank of each bolt 50 fits freely through a slightly larger clearance opening 52 in the wall 53 of the bearing housing block 48 and the distance between the bolt head 54 and the upper surface 55 of the pressure plate is in excess of the thickness across the wall 53. This thereby allows axial movement of the bearing housing block 48 toward and away from the pressure plate 22 and ensures that all compressive forces between the block 48 and the pressure plate 22 go through the thrust ball 46.

A pair of oppositely positioned angular contact bearing 60 and 62 are positioned within the bearing housing block 48 with the outer races 64 and 66 respectively of the bearings being in tightly fitted fixed relationship to the bearing housing block. The lower end of the shaft 26 fits through an opening 68 in top wall 70 of the bearing housing block 48, and the inner races 72 and 74 respectively of the bearing 60 and 62 are tightly fitted onto the stubbed lower end of the shaft 26. A locking washer 75 (see FIG. 5) fits within a slot on the lower end of the shaft 26 and holds the inner races 72 and 74 of the bearing tightly against a shoulder 76 on the shaft. Balls 78 and 80 as is well known fit rotatably between the inner races and outer races of the respective bearing units 60 and 62 to allow rotational movement of the races relative to one another generally about an axis transverse to the plane of the balls. The outer races 64 and 66 of the bearings are confined, respectively, between shoulders 81 and 82 on the bearing housing block 48. It should further be noted that each of the angular contact bearings 60 and 62 has an effective thrust angle in the range of between 50° and 75° relative to the shaft 26.

In point of convenience, the bearing housing block 48 is preferably formed as two separable pieces 84 and 86 (see FIG. 6) which are held together by three screws 88 each fitted through an opening in the lower piece 86 and threaded into an opening in the upper piece 84. In this manner the outer races 64 and 66 of the bearings can be nested within the appropriately fitting counterbore in the cup shaped upper piece 84 against shoulder 81 while the appropriately defined lower shoulder 82 can be located on the lower piece 86.

An O-ring seal 90 is fitted about the lower exterior perimeter of the bearing housing block 48 trapped generally within a recessed shoulder area 92 (see FIG. 6). The O-ring 90 abuts against the pressure plate 22 to prevent migration or influx of any of the abrasive slurry past the seal into the area of the bearing 46. Likewise there exists a seal or closure member 94 which is secured onto an intermediate portion of the shaft 26 and which fits in reasonably tight overlying relationship relative to the upper opening 68 in the bearing housing block 48 annularly of the shaft.

It is noted that the opposed seating areas of each pair of inner and outer bearing races are inclined on an angle as exemplified by the lines of force 96 (see FIG. 6) and 98 (see FIG. 5) of the bearings 60 and 62 respectively.

These lines of force are inclined opposite to one another, upwardly and radially outward from the inner race 72 of the upper bearing 60 and downwardly and radially outward from the inner race 74 of the lower bearing 62.

This illustrated bearing arrangement is well suited for use in the support of a pressure plate 22 of a lapping machine 10. Thus, the singular ball 46 cooperating between the bearing housing block 48 and the pressure plate 22 allows for central axial thrust transmission between the shaft 26 and the pressure plate. By locating this bearing 46 in reasonably close proximity to the lower surface of the pressure plate 22, the axial load of the shaft 26 is transmitted uniformly through the center of the pressure plate while yet minimizing the creation of moments about the pressure plate even when the pressure plate is canted relative to the shaft. In this regard, the pressure plate 22 is free to cant at least to the extend indicated by phantom lines 22a and 22b in FIG. 3.

Further, the bottomed balls 80 of the lower bearing unit 62 transmit forces across the bearing races 66 and 74 on angles inclined below the horizontal in the direction of the force. This is as noted by the arrows in FIG. 5 from the shaft and shoulder 76 to the inner races 72 and 74 of the bearings and through both inner races across the balls 80 to the outer race 66 of the lower bearing 62 and in turn to bearing housing block 48 via the shoulder 82 and the self aligning ball 46 centrally to the pressure plate 22. However, the bearing block 48 can yet be freely rotated relative to the shaft 26 regardless of minor canting action of the pressure plate 22 relative to the shaft (as per 22a or 22b, FIG. 3) and *further regardless of the magnitude of the axial load.*

Should the pressure plate shaft 26 be elevated to lift the pressure plate 22 from contact against the underlying work piece 36 and/or fixture 32 (see FIGS. 2 and 6) the weight of the pressure plate 22 is transmitted to the shaft via the lock washer 75 and the inner races 72 and 74 of the bearing units through the balls 78 along the inclined lines of force 96 (see FIG. 6) to the outer race 64 of the upper bearing 60, and via shoulder 81 and the bearing housing block 48 and the headed bolts 50 to the pressure plate. Rotation of the pressure plate 22 relative to the shaft 26 is yet allowed because of the upper bearing unit 60.

While reference has consistently been made only to the pressure cylinder or plate shaft 26, in fact it probably would be preferred to use a separate pressure plate shaft unit, as illustrated by 26a, which would be detachably connected to the pressure cylinder rod or shaft 26. Referring to FIG. 3, such a connection might thus include an exterior thread 102 and 102a formed on the adjacent ends respectively of the pressure cylinder shaft 26 and the pressure plate shaft 26a, and a sleeve coupling 104 threaded onto these threads. In actuality however, the pressure cylinder shaft 26 and the pressure plate shaft 26a act as a unitary member.

What is claimed is:

1. For use in a lapping machine having a lap wheel rotated about a fixed axis and at least one pressure plate supported on a shaft disposed generally parallel to the lap wheel axis but laterally offset therefrom, an improved bearing mount between the pressure plate and shaft that accommodates both axial compression and lifting loads between the shaft and pressure plate while yet allows free rotation and swiveling of the pressure plate relative to the shaft, the combination comprising a bearing housing block and means nonrotatably keying the bearing housing block coaxially of the pressure plate while yet allowing the pressure plate to move axially and wobble slightly relative to the bearing housing block, bearing means rotatably supporting the bearing housing block coaxially of the shaft, said bearing means having inner races disposed on the shaft and having outer races disposed in the bearing housing block and means engaging the inner and outer races of the bearings units for holding them on the shaft and in the bearing housing block respectively, and a self-aligning axial thrust ball bearing coaxially disposed between and engaged by the bearing housing block and the pressure plate under the axial compression loads of the shaft.

2. A bearing mount combination according to claim 1, wherein the rotatable bearing means are in the form of a pair of opposed angular contact bearings mounted in opposed back to back fashion on the shaft so that one of the angular contact bearings acts to absorb the axial compression load between the shaft and the pressure plate while the other angular contact bearing acts to absorb the axial lifting loads between the shaft and the pressure plate.

3. A bearing mount combination according to claim 2, wherein each angular contact bearing has an effective thrust angle inclined of the order of between 75 and 50 degrees relative to the shaft.

4. A bearing mount combination according to any of claims 1, 2 or 3, wherein the bearing housing block is formed of at least two pieces secured relative to one another, one of the pieces being bell shaped and including a bore adapted to receive the outer races of the rotatable bearing means and the other of the pieces being generally disc shaped designed to hold the bearing means within the bell shaped piece.

5. A bearing mount combination according to any of claims 1, 2 or 3, wherein the means for nonrotatably keying the bearing housing block relative to the pressure plate includes at least three spaced openings in said bearing housing block and a shouldered bolt freely fitted through each opening and secured to the pressure plate, each of the bolts having a smooth shank longer than the thickness of the bearing housing block through said opening and a head that thereby traps the bearing housing block for axial movement and swivel potential relative to the pressure plate.

6. A bearing mount combination according to claim 1, wherein the bearing housing block has a seat area on its outer face adapted to cooperate with the ball bearing, and wherein a bearing seat element is formed on the pressure plate and includes a seat area adapted to cooperate with the ball bearing.

* * * * *